(12) United States Patent
Slackman et al.

(10) Patent No.: US 7,451,155 B2
(45) Date of Patent: Nov. 11, 2008

(54) STATISTICAL METHODS AND APPARATUS FOR RECORDS MANAGEMENT

(75) Inventors: Richard Slackman, Shiloh, IL (US);
Don O'Brien, Benld, IL (US); William Apple, St. Charles, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 234 days.

(21) Appl. No.: 11/245,365

(22) Filed: Oct. 5, 2005

(65) Prior Publication Data

US 2007/0088715 A1 Apr. 19, 2007

(51) Int. Cl.
*G06F 17/30* (2006.01)
(52) U.S. Cl. .................. 707/100; 707/101; 707/102
(58) Field of Classification Search .................. 707/100
See application file for complete search history.

(56) References Cited

U.S. PATENT DOCUMENTS

| | | | | |
|---|---|---|---|---|
| 5,537,586 | A * | 7/1996 | Amram et al. | 707/3 |
| 5,680,606 | A * | 10/1997 | Nakajima et al. | 707/4 |
| 5,813,009 | A | 9/1998 | Johnson et al. | |
| 5,895,470 | A * | 4/1999 | Pirolli et al. | 707/102 |
| 6,148,301 | A * | 11/2000 | Rosenthal | 707/10 |
| 6,553,365 | B1 | 4/2003 | Summerlin et al. | |
| 6,751,600 | B1 * | 6/2004 | Wolin | 706/12 |
| 6,782,390 | B2 | 8/2004 | Lee et al. | |
| 6,795,820 | B2 * | 9/2004 | Barnett | 707/3 |
| 6,912,549 | B2 | 6/2005 | Rotter et al. | |
| 6,938,053 | B2 * | 8/2005 | Jaro | 707/104.1 |
| 7,028,250 | B2 * | 4/2006 | Ukrainczyk et al. | 715/500 |
| 7,254,588 | B2 * | 8/2007 | Sung et al. | 707/104.1 |
| 2002/0022956 | A1 * | 2/2002 | Ukrainczyk et al. | 704/9 |
| 2002/0087286 | A1 * | 7/2002 | Mitchell | 702/127 |
| 2002/0129021 | A1 * | 9/2002 | Brown | 707/10 |
| 2002/0156793 | A1 | 10/2002 | Jaro | |
| 2002/0161761 | A1 | 10/2002 | Forman et al. | |
| 2002/0188424 | A1 | 12/2002 | Grinstein et al. | |
| 2003/0014420 | A1 | 1/2003 | Jessee et al. | |
| 2003/0182304 | A1 | 9/2003 | Summerlin et al. | |
| 2003/0233350 | A1 * | 12/2003 | Dedhia et al. | 707/3 |
| 2005/0060295 | A1 * | 3/2005 | Gould et al. | 707/3 |
| 2005/0144184 | A1 | 6/2005 | Carus et al. | |
| 2005/0149546 | A1 | 7/2005 | Prakash et al. | |
| 2006/0101095 | A1 * | 5/2006 | Episale et al. | 707/204 |
| 2006/0106885 | A1 * | 5/2006 | Blumenau et al. | 707/200 |
| 2006/0161423 | A1 * | 7/2006 | Scott et al. | 704/10 |
| 2007/0174179 | A1 * | 7/2007 | Avery | 705/37 |

\* cited by examiner

*Primary Examiner*—Yicun Wu
(74) *Attorney, Agent, or Firm*—Hanley, Flight & Zimmerman, LLC

(57) ABSTRACT

Statistical methods and apparatus for records management are disclosed. An example method for records management disclosed herein comprises classifying a record into at least one of a plurality of categories based on a statistical value, and performing an operation with respect to the record according to a rule associated with the at least one of the plurality of categories, wherein the operation is performed based on the statistical value.

44 Claims, 13 Drawing Sheets

| Linguistic Assessment | Numeric Statistical Value |
|---|---|
| Absolutely in This Category | 100% |
| Very Likely in This Category | 80% |
| Likely in This Category | 50% |
| Possibly in This Category | 20% |
| Unlikely in This Category | 5% |
| Not in This Category | 0% |

U.S. 7,451,155 B2

1

STATISTICAL METHODS AND APPARATUS FOR RECORDS MANAGEMENT

FIELD OF THE DISCLOSURE

This disclosure relates generally to records management, and, more particularly, to statistical methods and apparatus for records management.

BACKGROUND

Records management is employed by many entities, such as corporations, academic institutions, non-profit organizations, etc., to manage records to meet regulatory and/or other compliance requirements. A typical records management program encompasses many procedures, including record identification, classification, retention, searching, production and destruction. Records management procedures may be difficult and/or expensive to implement, especially in cases in which the entity possesses and/or processes a large number of records, utilizes a complex record categorization scheme, employs personnel have a wide range of expertise to implement its records management program, etc.

Known records management programs are usually based on a file plan which, for example, in the case of a corporation, may be created by a corporate records manager in consultation with the corporation's legal department/counsel. The file plan typically defines multiple categories into which a record may be classified. Associated with each category are implied or explicit membership rules which define membership in the particular category, and implied or explicit management rules which determine how records in the particular category should be managed. After the creation of the file plan, company records are classified into one or more categories based on the membership rules of each category. After classification, a record is managed under the records management program according to the management rules associated with the category or categories into which the record is classified.

As an example, an accounts receivable bill may be classified under a records management program into an accounts receivable category of an example file plan. Furthermore, the accounts receivable category may include a management rule which indicates that all accounts receivable records should be retained for a minimum number of years, such as, for example, seven years. In another example, a record may be classified into both an accounts receivable category and an accounts payable category of an example file plan. In this example, a management rule associated with the accounts receivable category may indicate that all accounts receivable records should be retained for seven years, whereas another management rule associated with the accounts payable category may indicate that all accounts payable records should be retained for five years. In such a case, the record retention procedure of the records management program may require that the record be retained for the longer of the two periods, which would be seven years.

Accuracy is often an important concern of the entity implementing a records management program. For example, records management programs designed to address federal regulations, such as the Sarbanes-Oxley Act or the Health Insurance Portability and Accountability Act (HIPAA), may require accurate records classification and retention/destruction procedures to achieve desired compliance levels. However, the desired accuracy may be difficult to achieve with existing records management programs because of limited flexibility in the rules governing category membership and record management. For example, classification of a record into a particular category is typically a binary decision to either include or not include the record in the category. Additionally, in cases in which the record is classified into multiple categories having different management rules, processing the record according to these multiple management rules is typically restricted to simply selecting one of the rules according to some predetermined criteria. Furthermore, another factor affecting the accuracy of existing records management programs is the variability in classification results between two or more different people and/or tools performing the classification procedure and evaluating the category membership rules.

DETAILED DESCRIPTION

Figure 1:
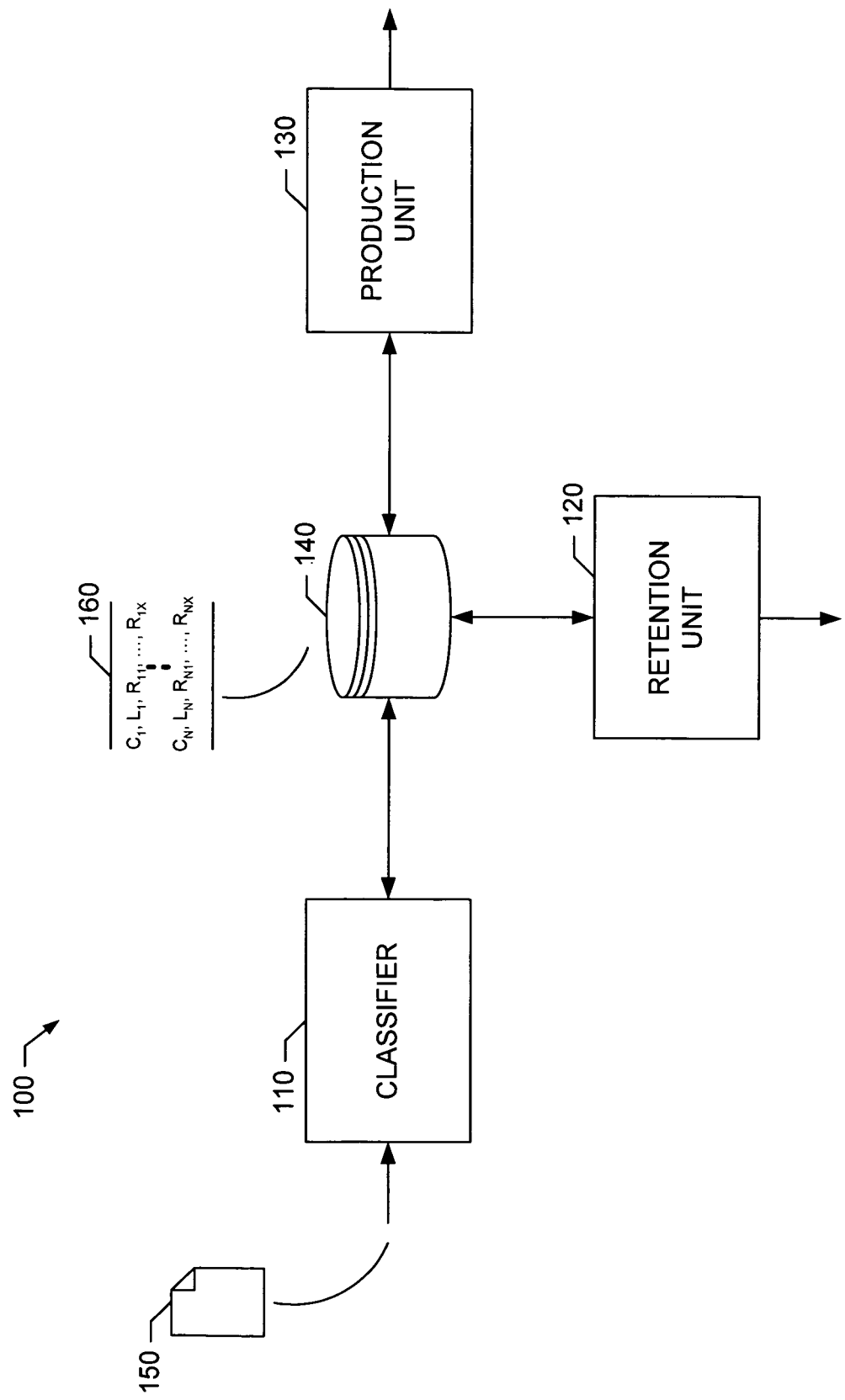
FIG. 1 is a block diagram of an example records management system.

An example records management system 100 that may be used to implement a records management program is illustrated in FIG. 1. In the illustrated example, the records management system 100 supports classifying a record into at least one of a plurality of categories based on a statistical value. The records management system 100 also supports performing an operation with respect to the record according to a rule associated with the at least one of the plurality of categories, wherein the operation is performed based on the statistical value.

Example records that may be processed by the example records management system 100 include, but are not limited to, medical records, accounting records, legal opinions, insurance claims, employment applications, payroll records, shipping records, invoices, accounts receive and/or payable records, etc. Such example records may exist in a tangible form by comprising, for example, one or more paper documents, or the records may exist in an intangible form, for example, as data stored in an electronic or other suitable medium, or any combination thereof. Example rules by which the example records management system 100 may perform one or more operations on a record include, but are not limited to, retention rules that govern the conditions under which the record is retained, confidentiality rules that govern to what extent the contents of the record may be disclosed, security rules that govern to what extent the record may be accessed and/or distributed, etc.

The example records management system 100 of FIG. 1 includes a classifier 110, a retention unit 120, a production unit 130 and a storage unit 140 to process records, such as record 150, according to a file plan. As discussed above, an entity, such as a corporation, academic institution, non-profit organization, etc., may create the file plan as part of a records management program, for example, to meet regulatory and/or other compliance requirements.

The classifier 110 of the example records management system 100 is configured to classify records, such as the record 150, into one or more categories defined by the file plan. The classifier 110 begins the classification procedure by assessing the contents of the record 150 against membership rules associated with each category. The assessment may be made, for example, by an automated tool capable of processing the contents of the record 150 and comparing the contents to the membership rules, by one or more people assessing the contents of the record 150 manually, and/or any combination thereof. After performing an assessment for a particular category, the classifier 110 then determines a likelihood that the record 150 should be classified into the particular category. Again, the likelihood may be determined by an automated tool, one or more people performing the assessment, and/or any combination thereof. Then, based on this likelihood, the classifier 110 decides whether to classify the record 150 into the particular category being assessed.

The classifier 110 classifies the record 150 into a particular category by determining a statistical value to represent the association of the record 150 with the category. The statistical value may be, for example, a probability, in which case the likelihood resulting from the assessment procedure may represent the probability that the record 150 belongs in the category based on assessing the record contents against the membership rules. Additionally or alternatively, the statistical value may be, for example, a confidence level, in which case the likelihood resulting from the assessment procedure may represent an expected accuracy that the assessment procedure correctly classified the record 150 into the category. In the example of FIG. 1, the classifier uses a category map 160 to represent the association of the record 150 with the particular category. After the classifier 110 finishes processing the record 150, the category map 160 represents the classification of the record 150 into one or more categories defined by the file plan. The contents of the category map 160 are discussed in greater detail below in connection with FIG. 3. Example machine readable instructions 800 that may be executed to implement the classifier 10 are discussed in the detailed description of FIG. 8 below.

The retention unit 120 of the example records management system 100 is configured to operate on the record 150 according to one or more managements rules associated with the one or more categories into which the record 150 is classified to determine whether the record 150 should be retained or destroyed. A records management program may use different management rules to specify different retention periods for records falling into different categories. In such cases, a particular category may have an associated retention management rule having one or more criteria (e.g., such as a duration) which specify the retention period for a record in the particular category. Thus, the retention unit 120 may examine, for example, the category map 160 to determine into which category or categories the record 150 was classified and evaluate the retention management rule or rules associated with respective category or categories. Furthermore, the retention unit 120 may evaluate the statistical value for each category in the category map 160 to determine whether the record 150 should be considered a member of the particular category for purposes of making a retention decision concerning the record 150. Additionally or alternatively, the retention unit 120 may employ one or more techniques to combine retention management rules if the record 150 is determined to be classified into more than one category. Example machine readable instructions 1100 that may be executed to implement the retention unit 120 are discussed in the detailed description of FIG. 11 below.

The production unit 130 of the example records management system 100 is configured to operate on the record 150 according to one or more criteria of the records management program to determine whether the record 150 should be produced for subsequent inspection and/or use. The production unit 130 may be configured to produce the record 150, for example, in response to a request for a specific record, a query to produce records classified into a particular category, the occurrence of an event, a litigation discovery request, etc. Furthermore, depending on the reason for determining whether to produce the one or more records 150, the production unit 130 may evaluate the statistical values included in the category map 160 of one or more records 150 to make its determination. For example, in the case of a query to produce records classified into a particular category, the production unit 130 may examine the category map 160 of a particular record 150 to determine whether the particular category is included in the category map 160. If the category is present, the production unit 130 may additionally evaluate the statistical value associated with the category to determine whether it meets one or more record production criteria (e.g., such as whether the statistical value exceeds a threshold). Then, if the statistical value meets the one or more criteria, the production unit 130 may decide to produce the record 150 in response to the query. Example machine readable instructions 1300 that may be executed to implement the production unit 130 are discussed in the detailed description of FIG. 13 below.

The storage unit 140 of the example records management system 100 is configured to store category maps 160 corresponding to records 150. For example, category maps 160 may be stored as one or more data files, as entries in one or more databases, etc. Depending on the type of record 150, the storage unit 140 may be configured to also store the record 150 itself (e.g., such as in the case of an electronic record) or an indirect reference to the location of the record 150 (e.g., such as in the case of a paper record physically stored in a filing room or other storage area). The storage unit 140 is configured to associate, either explicitly or implicitly, a stored category map 160 with its corresponding record 150 to allow other elements of the records management system 100 (e.g., such as the retention unit 120 and/or the production unit 130) to operate on a particular record 150 based on its category map 160.

Figure 2:
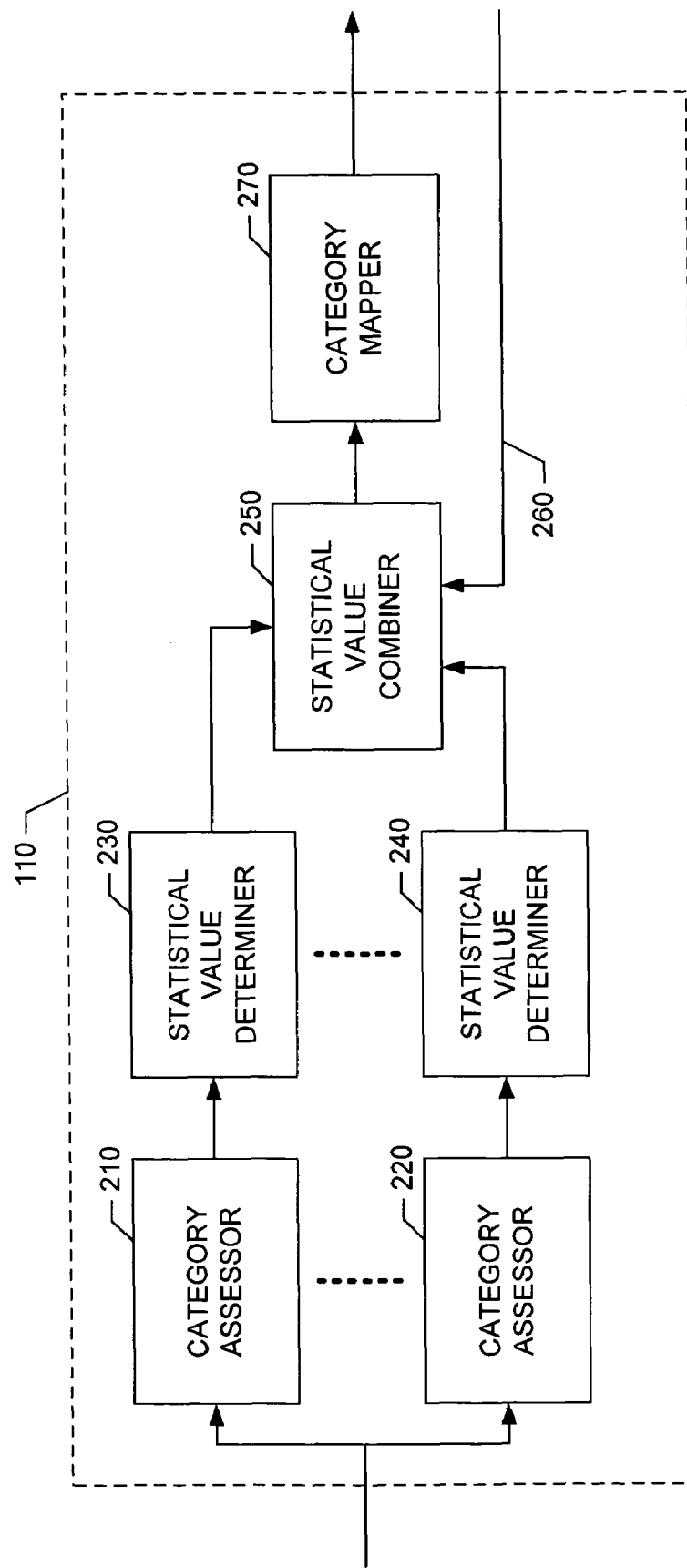
FIG. 2 is a block diagram of an example classifier that may be used in the example records management system of FIG. 1.

An example implementation of the classifier 110 of the records management system 100 of FIG. 1 is shown in FIG. 2. The example classifier 110 of FIG. 2 is configured to classify records subject to a records management program into one or more categories defined by a file plan. The classifier 110 of FIG. 2 includes one or more category assessors, shown as category assessors 210-220. In some examples, the classifier 110 may employ a single category assessor 210, such as in the case of record classification performed automatically by a single automated tool or manually by a single person. In other examples, the classifier 110 may employ multiple category assessors 210-220, such as in cases in which automatic classification performed by an automatic tool is supervised and/or checked by a human operator, or in which manual classification performed by a person is supervised/checked by another person, or in which separate manual classifications are performed by multiple people, etc. Persons of ordinary skill in the art will appreciate that the multiple category assessors 210-220 may perform their respective assessments at substantially the same time (e.g., such as in the case of multiple assessments of a record which are later combined) or at substantially different times (e.g., such as in the case of a first assessment of a record with is later verified by a second assessment).

A category assessor 210 or 220 examines or otherwise operates on an input record to assess a likelihood of whether the record should be classified into one more categories defined by a file plan created to implement a records management program. For example, a category assessor 210 implemented by an automated tool may process and compare some or all of the contents of the input record to one or more membership rules associated with a particular category to determine a numeric likelihood assessment of whether the record should be classified into the particular category. The numeric assessment could be a correlation score from zero to some maximum value representative of the correlation of some or all of the contents of the record to the category membership rules, with zero indicating that the record contents have no correlation with the category membership rules, and the maximum value indicating that the record contents have the strongest possible correlation with the category membership rules. In another example, a category assessor 220 implemented manually by a person may process and compare some or all of the contents of the input record to the one or more membership rules to determine a linguistic likelihood assessment of whether the record belongs in the particular category. Example linguistic assessments include phrases such as "absolutely in this category," "very likely in this category," "likely in this category," "possibly in this category," "unlikely in this category," "not in this category," etc. In yet another example, the classifier 110 may include both a category assessor 210 implemented by an automated tool and yielding a numeric likelihood assessment and a category assessor 220 implemented manually by a person and yielding a linguistic likelihood assessment.

The example classifier 110 of FIG. 2 includes one or more statistical value determiners 230-240. The statistical values determined by the statistical value determiners 230-240 represent the association between the input record and the particular category as assessed by the category assessors 210-220. For example, in the case of a category assessor 210 implemented by an automatic tool and yielding a numeric assessment, the statistical value determiner 230 may be configured to convert the numeric likelihood assessment indicated by a correlation score into a probability that the record belongs in the particular category, a confidence level associated with the correctness of classifying the record into the particular category, etc. As another example, in the case of a category assessor 220 implemented manually by a person, the statistical value determiner 240 may be configured to map the linguistic likelihood assessment to a probability or confidence level, or to first convert the linguistic assessment to a numeric assessment and then convert the numeric assessment to a probability or confidence level, etc. Persons of ordinary skill in the art will recognize that statistical value determiners 230 and/or 240 may not be required if the category assessors 210 and/or 220 yield an assessment which is already in the form of the expected statistical value, such as a probability, a confidence level, etc.

The example classifier 110 also includes a statistical value combiner 250. If the classifier 110 includes multiple category assessors 210-220, the statistical value combiner 250 may be configured to combine the individual statistical values associated with the multiple category assessors 210-220 and, for example, determined by the multiple statistical value determiners 230-240 into a composite statistical value representing the association of the record to the particular category. Example techniques which may be used by the statistical value combiner to combine statistical values include: averaging the statistical values, performing a weighted average of the statistical values with the weights representative of a particular category assessor's expected accuracy, ranking the statistical values and choosing the median, the mode, the maximum value, the minimum value, etc., and/or any other technique for combining statistical values. An example procedure for combining statistical values is discussed in more detail below in connection with FIG. 10. Additionally or alternatively, the statistical value combiner 250 may be configured to process an input 260 which provides the results of a previous classification procedure such that the statistical value combiner 250 may update the results based on the current classification operation. Alternatively, the classifier 110 may not include a statistical value combiner 250. For example, the statistical value combiner 250 may be excluded if the results of each category assessor/statistical value determiner pair are maintained separately for processing by other processing units in the records management system 100.

The example classifier 110 of FIG. 2 includes a category mapper 270, for example, to create and/or update a category map associated with the record. As mentioned previously, the category map is used to represent the classification of the input record into one or more categories defined by the file plan. In the example of FIG. 2, the category mapper 270 uses the composite statistical value output by the statistical value combiner 250 to determine whether the particular category being assessed should be included in the category map for the input record. The category mapper 270 may include a particular category in the category map based on various criteria, such as, for example, if the category is associated with a non-zero statistical value, if the statistical value associated with the particular category is not less than a threshold, if the statistical value exceeds a thresholds, etc. Additionally or alternatively, the category mapper 270 may be configured to limit the number of categories into which an input record may be classified. For example, the category mapper 270 may rank the statistical values for categories already included in the category map for the input record; add the particular category under consideration only if there is room in the category map and/or if the statistical value associated with the particular category exceeds the minimum statistical value already included in the category map; and, if necessary, remove the existing category having the minimum statistical value from the category map to make room for the particular category under consideration. An example category map which may be created and/or updated by the category mapper 270 is discussed in greater detail below in connection with FIG. 3.

Figure 3:
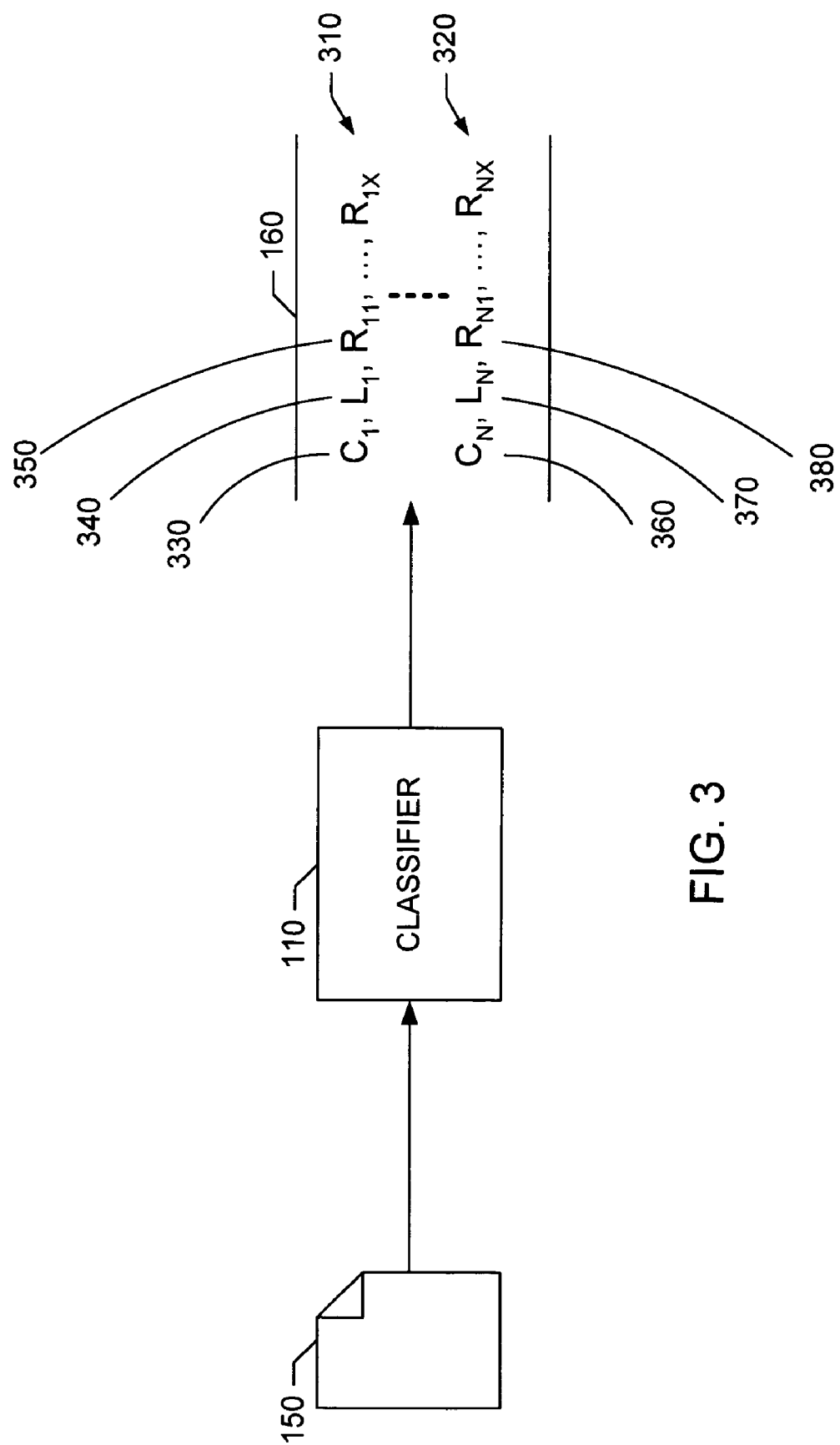
FIG. 3 illustrates an example operation of the example classifier of FIG. 2.

An example operation of the example classifier 110 is depicted in FIG. 3. In the example of FIG. 3, the classifier 110 operates on an input record 150 to produce a category map 160. As discussed above, the category map 160 represents the classification of the record 150 into one or more categories of a file plan. The example category map 160 contains category map entries 310-320, one entry for each category into which the record is classified. Persons of ordinary skill in the art will appreciate the many alternative formats for the category map 160 may be used to associate the record 150 with one or more categories.

The category map entry 310 of the category map 160 includes a particular category 330 into which the record 150 is classified and a statistical value 340 to represent the association between the record 150 and the category 330. For example, and as discussed above, the statistical value 340 may be a probability that the record 150 belongs to the category 330, or the statistical value 340 may be a confidence level representative of the expected accuracy of classifying the record 150 into the category 330, etc. Additionally, the category map entry 310 may include and/or reference one or more management rules 350 associated with the category 330. The management rules 350 may be indirect references/pointers to a repository of possible management rules, the actual management rules specifically associated with the particular category 330, a combination thereof, etc. Similarly, the category map entry 320 of the category map 160 includes a particular category 360 into which the record 150 is classified and a statistical value 370 to represent the association between the record 150 and the category 360. Additionally, the category map entry 320 may include and/or reference one or more management rules 380 associated with the category 360.

After the classifier 110 produces the category map 160, the record 150 may be processed according to any or all of the management rules 350 and 380 based on the respective statistical values 340 and 370. For example, the statistical value 340 may be evaluated to determine whether the association between the record 150 and the category 330 is sufficient enough to consider the record 150 as classified into the category 330 and, therefore, subject to one or more of the management rules 350. Similarly, the statistical value 370 may be evaluated to determine whether the association between the record 150 and the category 360 is sufficient enough to consider the record 150 as classified into the category 360 and, therefore, subject to one or more of the management rules 380. Additionally, if the record 150 is sufficiently associated with both the category 330 and the category 360, similar management rules 350 and 380 may need to be combined before the record 150 may be processed by that rule. For example, if both the management rules 350 and 380 contain a respective retention rule, the retention rules may need to be combined before determining whether to retain or destroy the record 150. Additional examples of processing the record 150 according to the category map 160 are discussed below in connection with FIGS. 5 and 7.

Figure 4:
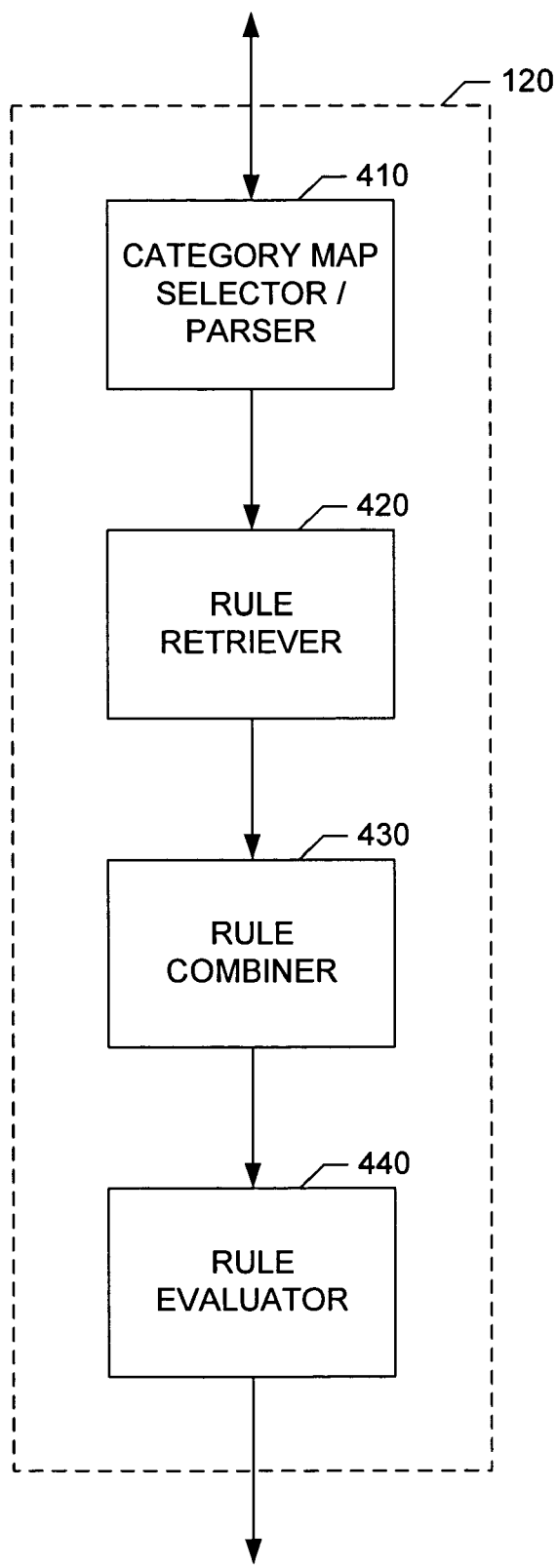
FIG. 4 is a block diagram of an example retention unit that may be used in the example records management system of FIG. 1.

An example implementation of the retention unit 120 of the records management system 100 of FIG. 1 is shown in FIG. 4. The example retention unit 120 of FIG. 4 is configured to process records subject to a records management program to determine whether or not the records should be retained or destroyed. The retention unit 120 includes a category map selector/parser 410 to select and parse a category map (e.g., such as the category map 160 of FIG. 1) associated with a record to be processed. For example, the category map selector/parser 410 may be invoked to select a category map associated with a specified record to allow the retention unit 120 to determine whether to retain or destroy the record. Additionally or alternatively, the category map selector/parser 410 may be invoked on a periodic basis (e.g., such as annually, quarterly, monthly, etc.) or an a periodic basis to select one or more category maps corresponding to one or more records governed by the records management program to determine whether such record or records should be retained or destroyed. Additionally or alternatively, the category map selector/parser 410 may be invoked based on the occurrence of an event (e.g., exceeding a specified storage capacity limit, classification of a new record, etc.) to select one or more category maps corresponding to one or more records to determine whether such record or records should be retained to destroyed. After selecting a category map, the category map selector/parser 410 parses the entries of the category map (e.g., such as category map entries 310 and 320) for further processing by the retention unit 120.

The example retention unit 120 of FIG. 4 also includes a rule retriever 420 to retrieve one or more management rules identified in the category map entry or entries provided by the category map selector/parser 410. For example, the rule retriever 420 may be configured to retrieve one or more management rules from a repository of possible management rules indirectly referenced by one or more pointers provided in the category map entry or entries. Additionally or alternatively, the rule retriever 420 may be configured to directly process one or more actual rules included in the category map entry or entries. The rule retriever 410 may also determine whether or not to retrieve a particular rule provided by a category map entry based on the statistical value associated with the particular map entry. For example, the rule retriever may evaluate the statistical value against one or more criteria to determine whether the association between the record and the category corresponding to the entry is sufficient to justify retrieval of the particular rule. Processing of category map entries by the rule retriever 420 is further discussed in the context of FIG. 5 below.

Figure 12:
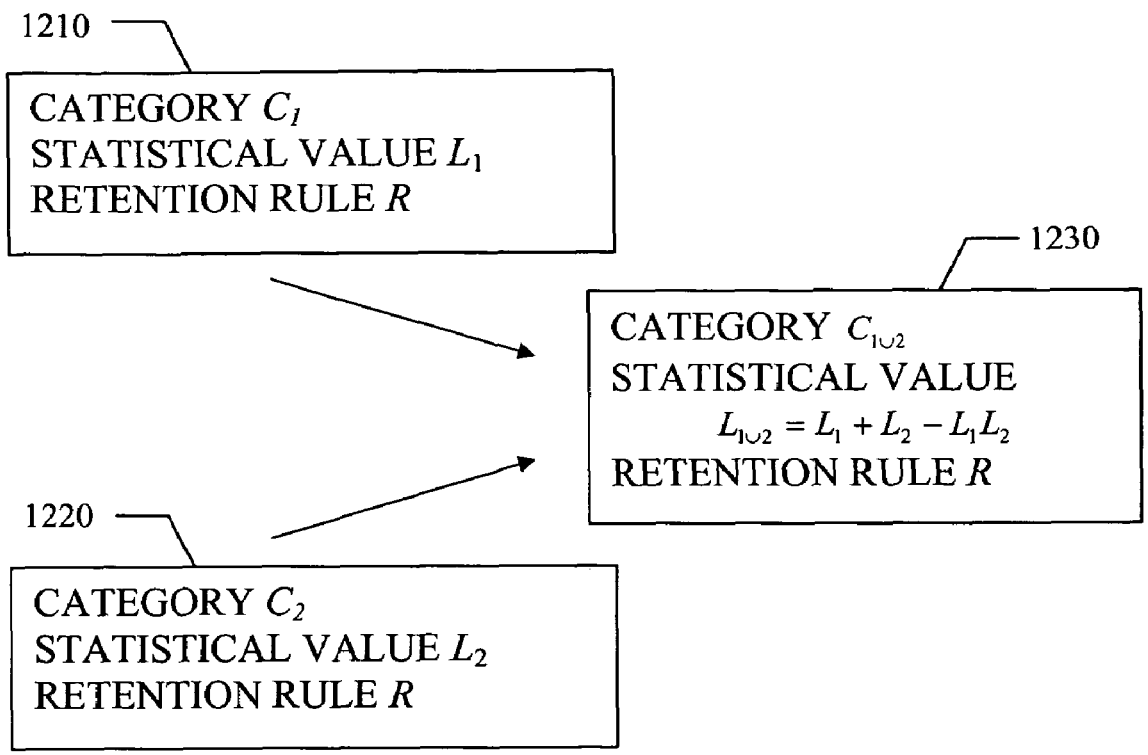
FIG. 12 illustrates an example technique to combine statistical values that may be used to implement the example retention unit of FIG. 4.

The example retention unit 120 of FIG. 4 also includes a rule combiner 430 to combine similar rules retrieved by the rule retriever 420 and included in two or more category map entries provided by the category map selector/parser 410. For example, the rule retriever 420 may combine two or more similar rules associated to two or more respective categories based on the statistical values associated with the respective categories to generate a composite rule having an associated composite statistical value. In the case of retention rule combining, two or more rules may be considered similar if they have similar retention periods. Thus, these rules may be combined into a single retention rule possessing a particular retention period (e.g., the longer of the similar retention periods) and having an associated composite statistical value based on combining the statistical values associated with the constituent category map entries. Combining of management rules by the rule combiner 430 is further discussed in the context of FIG. 5 below. Also, an example technique for combining similar management rules is illustrated in FIG. 12.

The example retention unit 120 of FIG. 4 includes a rule evaluator 440 to evaluate the record under consideration against rules retrieved by the rule retriever 420 (and possibly combined by the rule combiner 430) to determine how the record under consideration should be processed. In the case of evaluating records/retention rules, the rule evaluator 440 may make a decision regarding whether the record under consideration should be retained or destroyed and output such a decision for execution under the records management program. An example rule evaluation procedure which may be performed by the rule evaluator 440 is depicted in the context of the example machine readable instructions 1100 of FIG. 11 that may be executed to implement the retention unit 120.

Persons of ordinary skill in the art will appreciate that the architecture depicted in FIG. 4 may be adapted to implement other record processing operations in addition to record retention. For example, most record processing operations will require selection and parsing of the category map associated with a particular record (e.g., by the category map selector/parser 410). Additionally, the category map will probably include management rules governing the record processing operation of interest which will need to be retrieved (e.g., by the rule retriever 420) and possibly combined (e.g., by the rule combiner 430). Finally, such management rules will likely need to be evaluated in the context of the record processing operation to be performed (e.g., by the rule evaluator 440).

Figure 5:
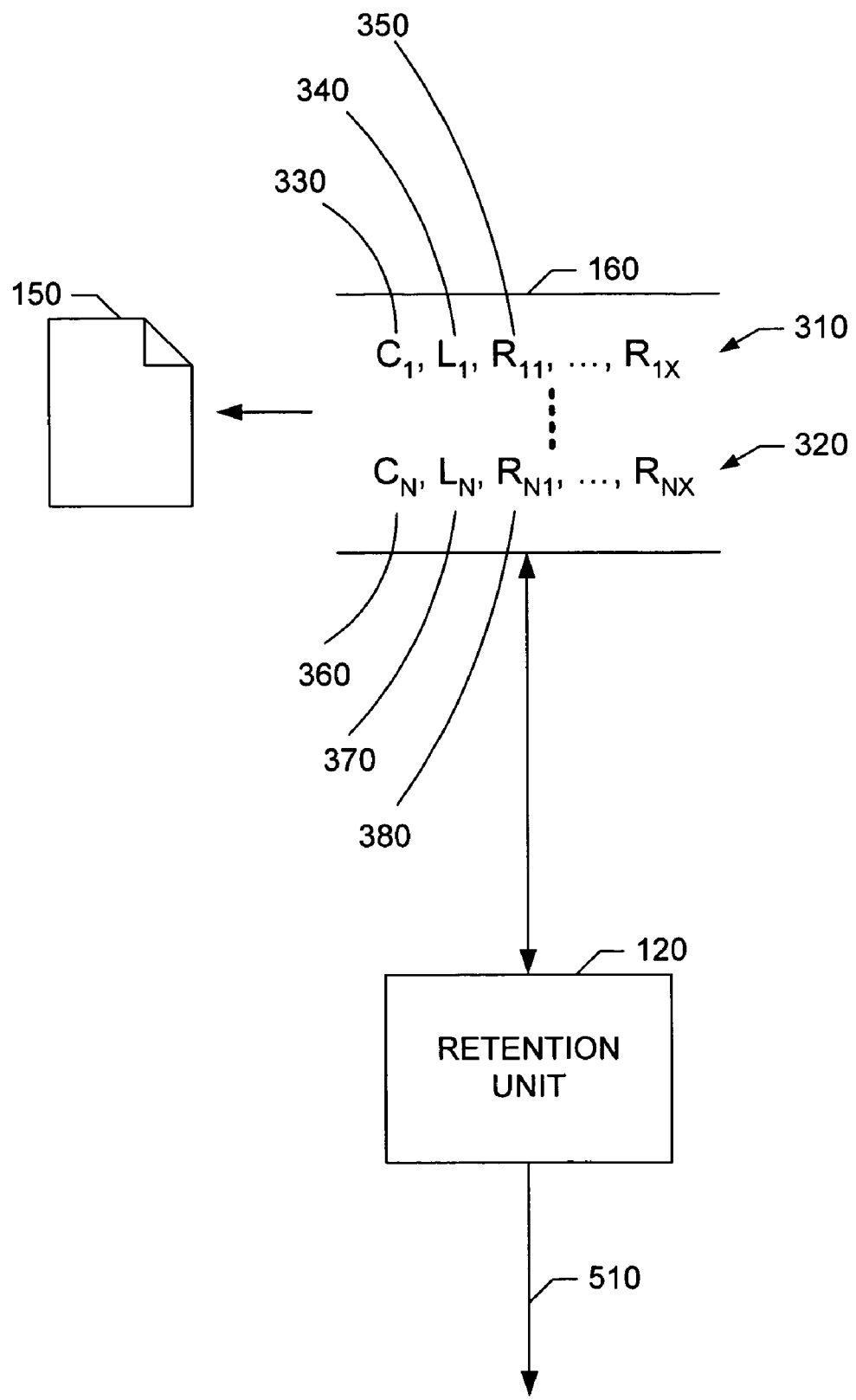
FIG. 5 illustrates an example operation of the example retention unit of FIG. 4.

An example operation of the example retention unit 120 is depicted in FIG. 5. In the example of FIG. 5, the retention unit 120 operates on a category map 160 associated with an input record 150 to produce a decision 510 regarding whether to retain or destroy the record 150. As discussed above, the category map 160 represents the classification of the record 150 into one or more categories of a file plan. As discussed above in the context of FIG. 3, the example category map 160 contains category map entries 310-320, one entry for each category into which the record is classified. Persons of ordinary skill in the art will appreciate that many alternative formats for the category map 160 may be used to associate the record 150 with one or more categories.

As discussed above in the context of FIG. 3, the category map entry 310 of the category map 160 includes a particular category 330 into which the record 150 is classified and a statistical value 340 to represent the association between the record 150 and the category 330. Additionally, the category map entry 310 may include and/or reference one or more management rules 350 associated with the category 330. The management rules 350 may be indirect references/pointers to a repository of possible management rules, the actual management rules specifically associated with the particular category 330, a combination thereof, etc. Similarly, the category map entry 320 of the category map 160 includes a particular category 360 into which the record 150 is classified and a statistical value 370 to represent the association between the record 150 and the category 360. Additionally, the category map entry 320 may include one or more management rules 380 associated with the category 360.

The example retention unit 120 of FIG. 5 determines whether to retain or destroy the record 150 based on one or more retention rules included in the management rules 350 and 380 and according to the respective statistical values 340 and 370. For example, the rule retriever 420 of FIG. 4 may retrieve retention rules included in and/or referenced by the management rules 350 and 380. Additionally, the rule evaluator 440 may evaluate the statistical value 340 to determine whether the association between the record 150 and the category 330 is sufficient enough to consider the record 150 as classified into the category 330 and, therefore, subject to a first retention rule included in and/or referenced by the management rules 350. Similarly, the rule evaluator 440 may evaluate the statistical value 370 to determine whether the association between the record 150 and the category 360 is sufficient enough to consider the record 150 as classified into the category 360 and, therefore, subject to a second retention rule included in and/or referenced by the management rules 380. Furthermore, if the record 150 is sufficiently associated with both the category 330 and the category 360, the rule combiner 430 may need to combine the first retention rule and the second rule included in and/or referenced by the management rules 350 and 380, respectively, before evaluation by the rule evaluator 440. For example, if both the first retention rule and the second retention rule include a similar retention period, the rule combiner 430 may combine these rules before the rule evaluator 440 determines whether to retain or destroy the record 150. Finally, the retention unit 120 outputs a decision 510 regarding whether to retain or destroy the record 150 based on the rule evaluation performed by the rule evaluator 440.

Figure 6:
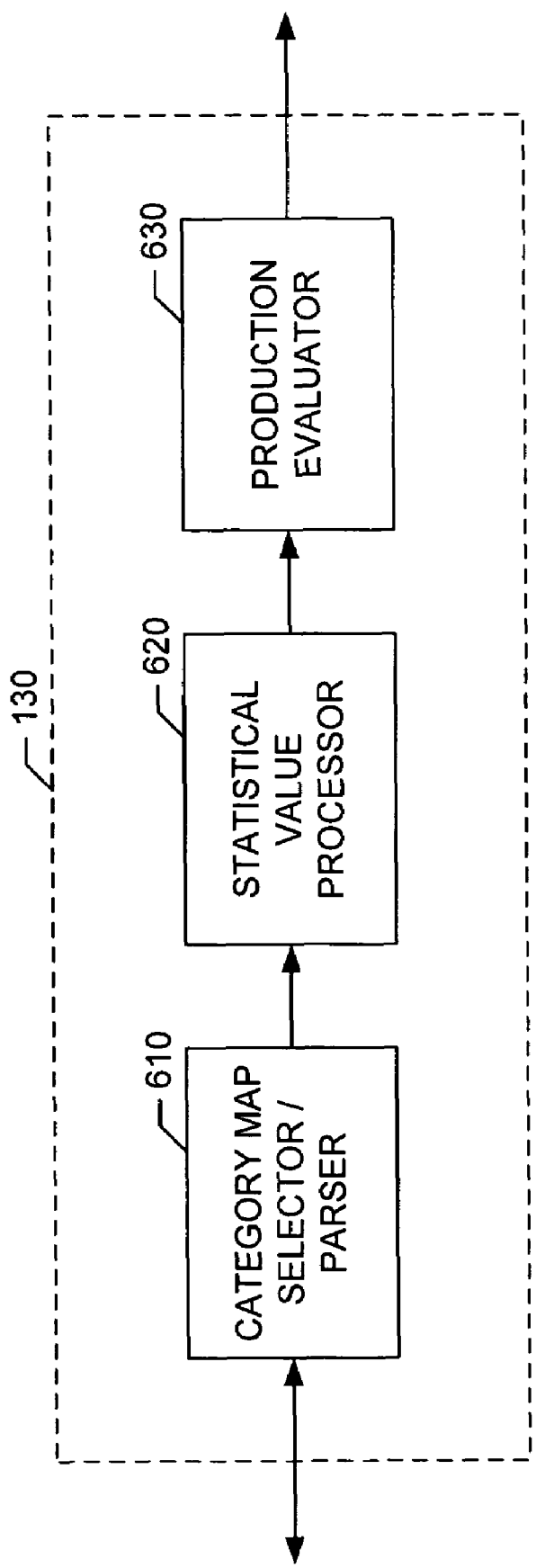
FIG. 6 is a block diagram of an example production unit that may be used in the example records management system of FIG. 1.

An example implementation of the production unit 130 of the records management system 100 of FIG. 1 is shown in FIG. 6. The example production unit 130 of FIG. 6 is configured to process records subject to a records management program to determine whether or not the records should be produced for subsequent inspection and/or use. The production unit 130 includes a category map selector/parser 610 (similar to the category map selector/parser 410 of FIG. 4) to select and parse a category map (e.g., such as the category map 160 of FIG. 1) associated with a record to be processed. For example, the category map selector/parser 610 may be invoked to select a category map associated with a specified record to allow the production unit 130 to determine whether to produce the record. Additionally or alternatively, the category map selector/parser 610 may be invoked on a periodic basis (e.g., such as annually, quarterly, monthly, etc.) or an a periodic basis to select one or more category maps corresponding to one or more records governed by the records management program to determine whether such record or records should be produced. Additionally or alternatively, the category map selector/parser 610 may be invoked based on the occurrence of an event (e.g., exceeding a specified storage capacity limit, classification of a new record, etc.) to select one or more category maps corresponding to one or more records to determine whether such record or records should be produced. After selecting a category map, the category map selector/parser 610 parses the entries of the category map (e.g., such as category map entries 310 and 320) for further processing by the production unit 130.

The example production unit 130 of FIG. 6 also includes a statistical value processor 620 to process the statistical value or values associated with the one or more categories included in the category map provided by the category map selector/parser 610. For example, the production unit 130 may be invoked in response to a query or event requiring production of records classified into a particular category. In such cases, the statistical value processor 620 may process the statistical value associated with the particular category to determine whether the record associated with the category map should be considered as being classified into the particular category. The processing performed by the statistical value processor 620 may include comparing the statistical value (e.g., which may be a probability, a confidence level, etc.) to a threshold indicative of a required degree of association between a record and a particular category for record production.

The example production unit 130 of FIG. 6 also includes a production evaluator 630 configured to evaluate the results of the statistical value processor to determine whether to produce the record associated with the category map provided by the category map selector/parser 610. For example, if the statistical value processor 620 determines that the statistical value for the particular queried category exceeds the required threshold, the production evaluator 630 may output a decision indicating that the record should be produced. An example production evaluation procedure which may be performed by the production evaluator 630 is depicted in the context of the example machine readable instructions 1300 of FIG. 13 that may be executed to implement the production unit 130.

Figure 7:
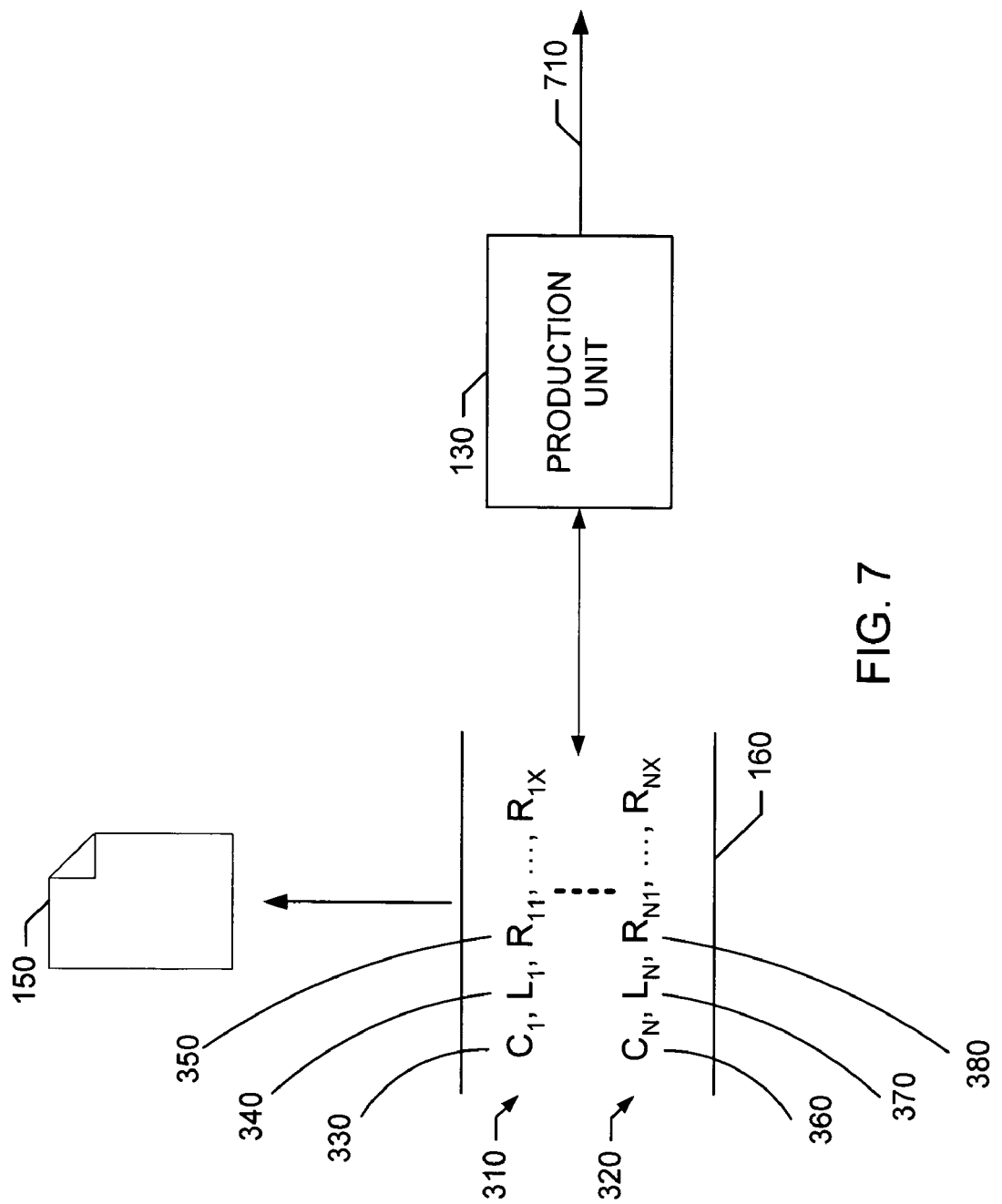
FIG. 7 illustrates an example operation of the example production unit of FIG. 2.

An example operation of the example production unit 130 is depicted in FIG. 7. In the example of FIG. 7, the production unit 130 operates on a category map 160 associated with an input record 150 to produce a decision 710 regarding whether to produce the record 150 for subsequent inspection and/or use. As discussed above, the category map 160 represents the classification of the record 150 into one or more categories of a file plan. As discussed above in the context of FIG. 3, the example category map 160 contains category map entries 310-320, one entry for each category into which the record is classified. Persons of ordinary skill in the art will appreciate the many alternative formats for the category map 160 may be used to associate the record 150 with one or more categories.

As discussed above in the context of FIG. 3, the category map entry 310 of the category map 160 includes a particular category 330 into which the record 150 is classified and a statistical value 340 to represent the association between the record 150 and the category 330. Additionally, the category map entry 310 may include and/or reference one or more management rules 350 associated with the category 330. The management rules 350 may be indirect references/pointers to a repository of possible management rules, the actual management rules specifically associated with the particular category 330, a combination thereof, etc. Similarly, the category map entry 320 of the category map 160 includes a particular category 360 into which the record 150 is classified and a statistical value 370 to represent the association between the record 150 and the category 360. Additionally, the category map entry 320 may include and/or reference one or more management rules 380 associated with the category 360.

The production unit 130 may determine whether to produce the record 150 based on the category or categories 330 and 360 included in the category map 160 and their respective statistical values 340 and 370. For example, in response to a record production query including category 330, the statistical value processor 620 may process the statistical value 340 to determine whether the association between the record 150 and the category 330 is sufficient enough to consider the record 150 as classified into the category 330. Similarly, in response to a record production query including category 360, the statistical value processor 620 may evaluate the statistical value 370 to determine whether the association between the record 150 and the category 360 is sufficient enough to consider the record 150 as classified into the category 360. Then, the production evaluator 630 may determine whether the record should be produced based on whether the statistical value processor 620 indicates that the record is classified into the particular queried category, such as category 330 or 360. Finally, the production unit 130 outputs a decision 710 regarding whether to produce the record 150 based on the record production evaluation performed by the production evaluator 630.

Figure 8:
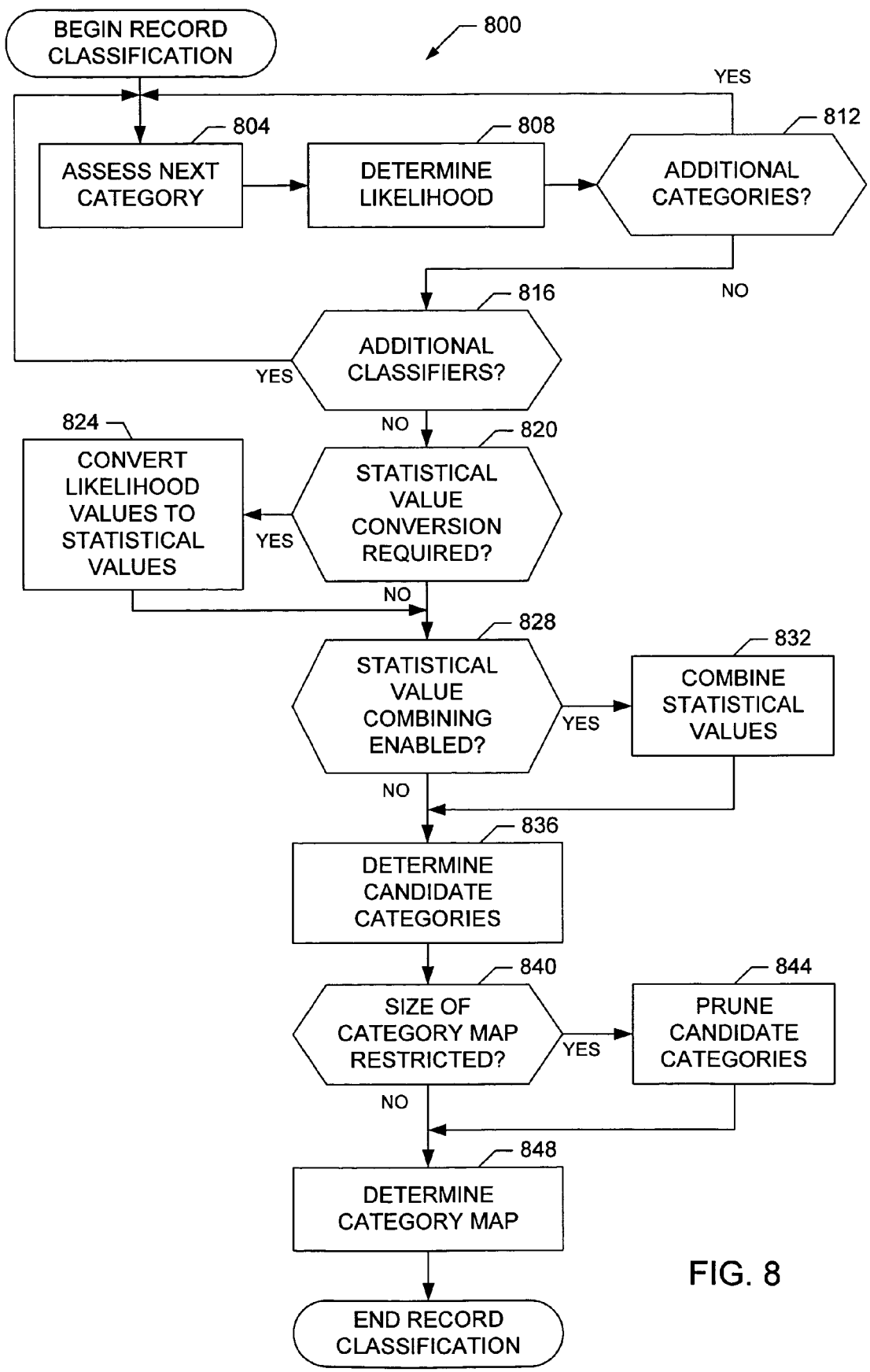
FIG. 8 is a flowchart representative of example machine readable instructions that may be executed to implement the example classifier of FIG. 2.
Figure 11:
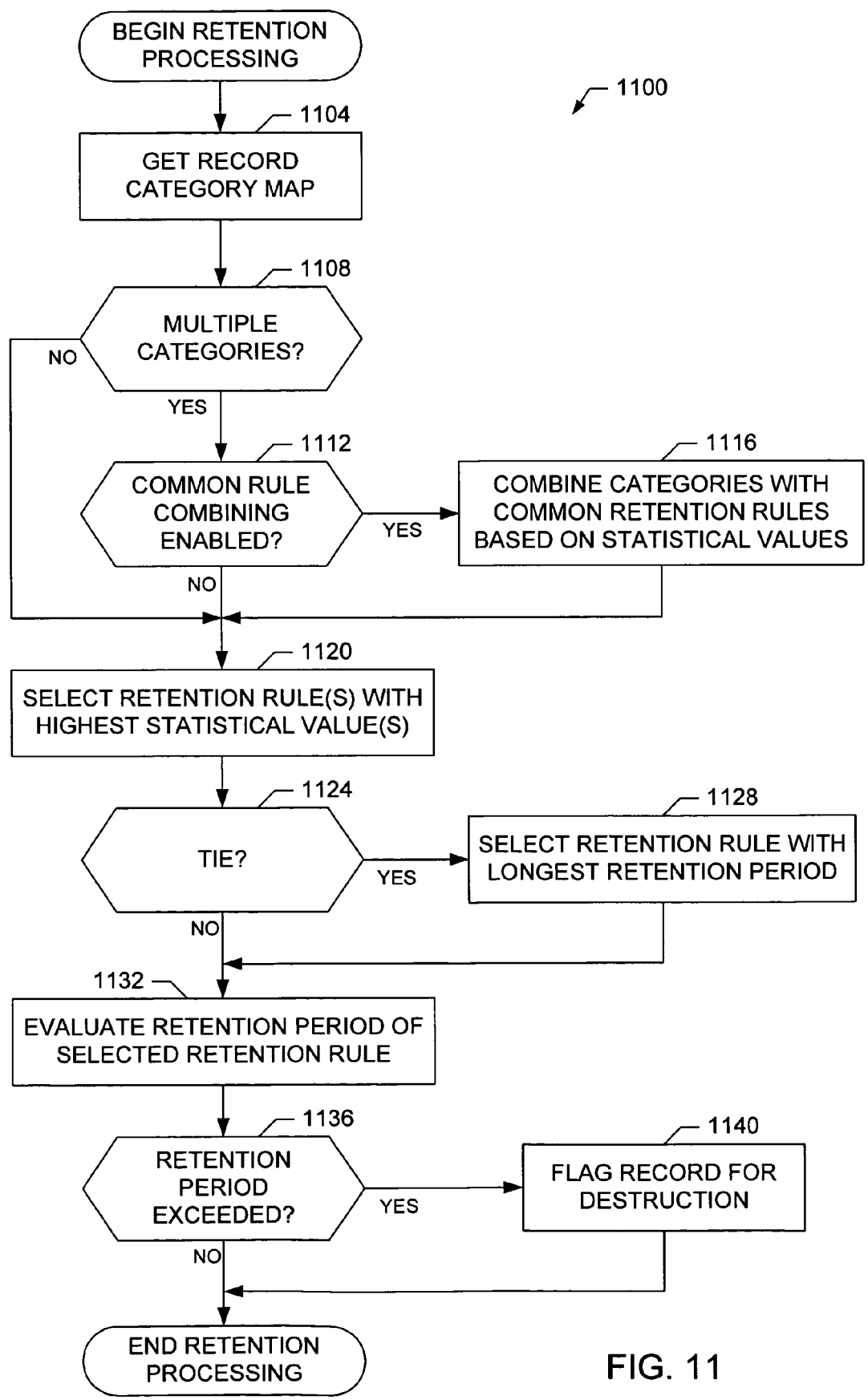
FIG. 11 is a flowchart representative of example machine readable instructions that may be executed to implement the example retention unit of FIG. 4.
Figure 13:
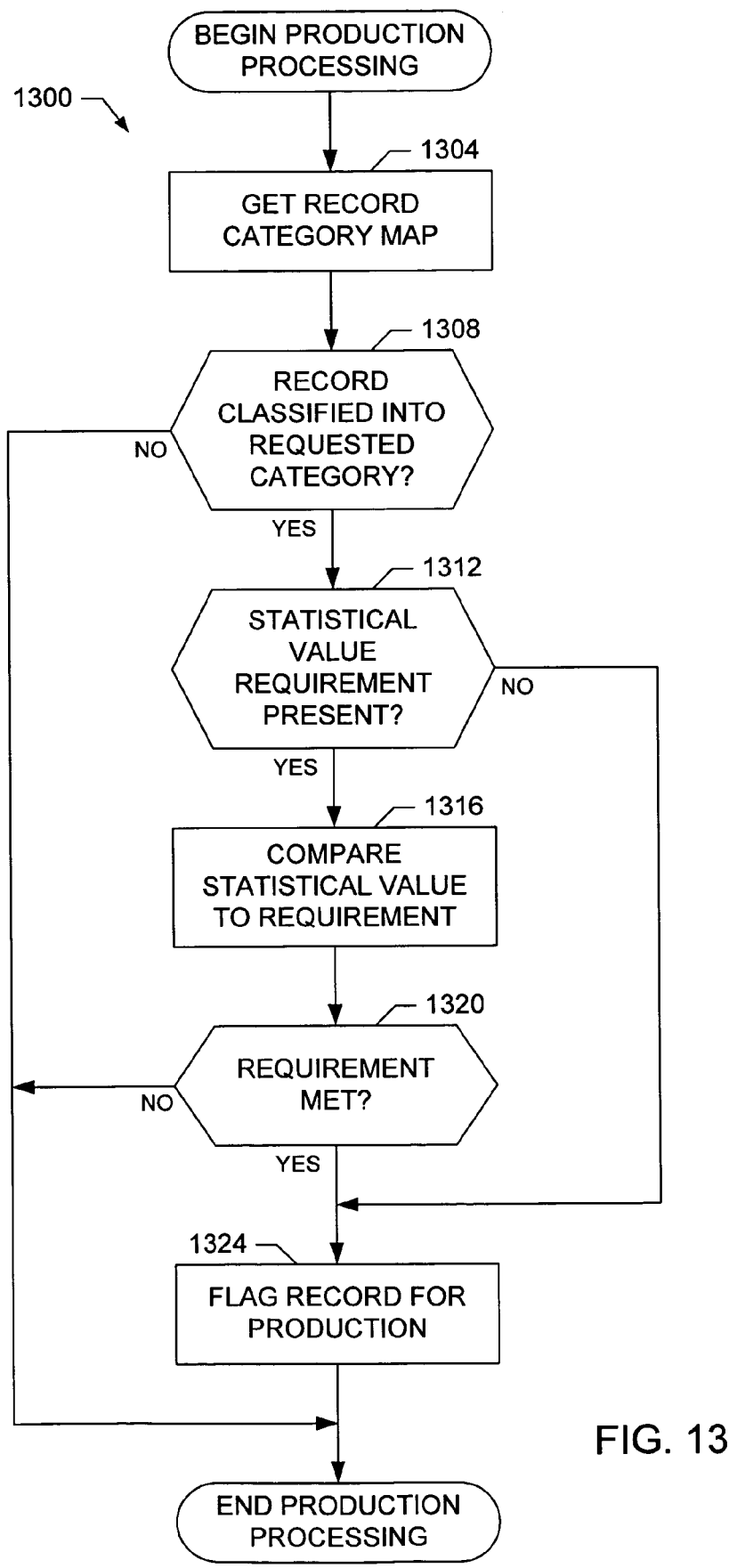
FIG. 13 is a flowchart representative of example machine readable instructions that may be executed to implement the example production unit of FIG. 6.

Flowcharts representative of example machine readable instructions that may be executed to implement the classifier 110 of FIG. 2, the retention unit 120 of FIG. 4 and the production unit 130 of FIG. 6 are shown in FIGS. 8, 11 and 13, respectively. In these examples, the machine readable instructions represented by each flowchart may comprise one or more programs for execution by: (a) a processor, such as the processor 1412 shown in the example computer 1400 discussed below in connection with FIG. 14, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1412, but persons of ordinary skill in the art will readily appreciate that the entire program or programs and/or portions thereof could alternatively be executed by a device other than the processor 1412 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the classifier 110, the retention unit 120 and/or the production unit 130 could be implemented by any combination of software, hardware, and/or firmware. Also, some or all of the machine readable instructions represented by the flowchart of FIGS. 8, 11 and/or 13 may be implemented manually. Further, although the example machine readable instructions are described with reference to the flowcharts illustrated in FIGS. 8, 11 and 13, persons of ordinary skill in the art will readily appreciate that many other techniques for implementing the example methods and apparatus described herein may alternatively be used. For example, with reference to the flowcharts illustrated in FIGS. 8, 11 and 13, the order of execution of the blocks may be changed, and/or some of the blocks described may be changed, eliminated, combined and/or subdivided into multiple blocks.

Example machine readable instructions 800 that may be executed to implement the classifier 110 of FIGS. 1 and 2 are shown in FIG. 8. The example machine readable instructions 800 operate to classify a record into one or more categories defined by a file plan used to implement a records management program. The example machine readable instructions 800 may be executed each time a new record is presented for classification, at predetermined intervals (such as, for example, a part of a larger control loop implementing a records management process), based on an occurrence of a predetermined event (such as, for example, after a predetermined number of records have been presented to a records management system for classification), etc., and/or any combination thereof.

The machine readable instructions 800 begin execution at block 804 at which the classifier 110 initiates a control loop to assess whether the input record should be classified into each category in the file plan. For example, at block 804 the category assessor 210 of FIG. 2 processes some or all of the contents of the record against the membership rules of the particular category under consideration. As discussed above, either or both of an automatic assessment or a manual assessment may be performed at block 804. After the particular category is assessed at block 804, control proceeds to block 808 at which the category assessor 210 determines a likelihood of whether the record should be classified into the particular category in the set of categories included in the file plan. As discussed above, the category assessor 210 may determine a numeric likelihood assessment of whether the record should be classified into the particular category (e.g., such as a correlation score between zero and a maximum value) and/or a linguistic assessment (e.g., such as one of the phrases "absolutely in this category," "very likely in this category," "likely in this category," "possibly in this category," "unlikely in this category," "not in this category," etc.) of whether the record should be classified into the particular category. After determining the likelihood assessment of whether to classify the record into the particular category under consideration, control proceeds to block 812 at which the classifier 110 determines whether there are additional categories in the file plan to assess. If there are additional categories to assess (block 812), control returns to block 804 and blocks subsequent thereto at which the next category is assessed. However, if there are no additional categories to process (block 812), control proceeds to block 816.

At block 816, the classifier 110 determines whether additional classifiers are present to assess the input record. For example, and as discussed above, the classifier may include multiple category assessors 210-220 which may operate, either together or independently and at substantially the same time or at substantially different times, to assess a record for classification into a particular example. Examples of multiple category assessors 210-220 include: a category assessor 210 implemented by an automatic tool which is supervised and/or operated by a category assessor 220 implemented manually by a person; multiple category assessors 210-220 implemented manually by two or more people, etc. If the classifier 110 determines that additional classifiers are present to process the input record (block 816), control returns to block 804 and blocks subsequent thereto at which the next category assessor (e.g., category assessor 220) assesses the input record for classification into the categories defined by the file plan. However, if there are no additional classifiers remaining to process the input record (block 816), control proceeds to block 820.

Figures 9, 10:
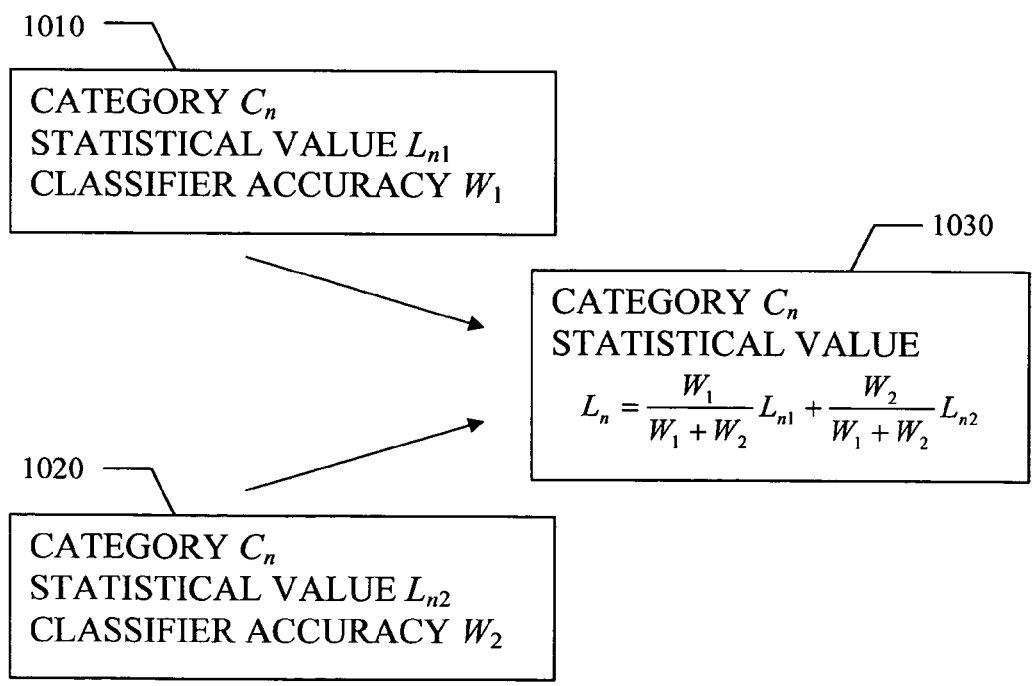
FIG. 9 illustrates an example conversion table that may be used to implement the example classifier of FIG. 2.
FIG. 10 illustrates an example technique to combine statistical values that may be used to implement the example classifier of FIG. 2.

At block 820, the classifier 110 determines whether the likelihood assessments determined at block 808 require conversion to generate the statistical values used to represent the association between the input record and one or more categories defined by the file plan. For example, the statistical value determiner 230 may need to generate the statistical value, such as a probability, a confidence level, etc., based on the likelihood assessment, such as a numeric correlation score, a linguistic phrase, etc., determined at block 808. If conversion of the likelihood assessment to the statistical value is required (block 820), control proceeds to block 824 at which the statistical value determiner 230 converts the likelihood assessments for the one or more categories of the file plan to the appropriate statistical values. FIG. 9 illustrates an example conversion table which may be used at block 824 to convert a linguistic likelihood assessment to a probability that the input record belongs in a particular category. In the example of FIG. 9, a linguistic likelihood assessment of "absolutely in this category" maps to a probability of 100%, a linguistic likelihood assessment of "very likely in this category" maps to a probability of 80%, and so on to a final mapping of "absolutely not in this category" to a probability of 0%. Persons of ordinary skill in the art will appreciate that the example table of FIG. 9 is but one possible example technique to convert likelihood assessments to appropriate statistical values.

Returning to FIG. 8, after the statistical values are determined at block 824, or if no conversion is required to determine the statistical values from the likelihood assessments (block 820), control proceeds to block 828. At block 828, the classifier 110 determines whether the classification procedure of the records management program enables statistical value combining. Statistical value combining may be appropriate when the classifier 110 includes multiple category assessors 210-220, each of which determine individual statistical values to associate the input record with a particular category. Statistical value combining allows the individual statistical values to be combined into a composite statistical value representing the association of the record to the particular category. If statistical value combining is enabled (block 828), control proceeds to block 832 at which, for example, the statistical value combiner 250 combines, if appropriate, individual statistical values resulting from separate classification assessments by multiple category assessors 210-220 into composite statistical values representing the association of the input record to one or more categories defined by the file plan.

An example technique for combining statistical values is illustrated in FIG. 10. The example of FIG. 10 depicts two category assessments 1010 and 1020 performed, for example, by two category assessors 210 and 220. The category assessments 1010 and 1020 correspond to assessing whether an input record should be classified into the category $C_n$. As shown, the first category assessor 210 determines a statistical value $L_{n1}$ representing the association between the category $C_n$ and the input record. Similarly, the second category assessor 220 determines a statistical value $L_{n2}$ representing the association between the category $C_n$ and the input record. Additionally, the first category assessor 210 and the second category assessor 220 have respective classification accuracies $W_1$ and $W_2$. The classification accuracies $W_1$ and $W_2$ may be determined theoretically based on the type of classification techniques employed by the category assessors 210 and 220, and/or determined experimentally by evaluating the results of previous classification assessments performed by the category assessors 210 and 220, and/or determined as expected accuracies based on, for example, the experience of one or more people implementing the category assessors 210 and 220, etc., and/or any combination thereof. The accuracies $W_1$ and $W_2$ may be used to weight the contribution of a particular category assessor's statistical value in the resulting composite statistical value. For example, the following expression may be used to combine the individual statistical values $L_{n1}$ and $L_{n2}$ according to the accuracies $W_1$ and $W_2$ to determine a composite category assessment 1030 having a composite statistical value $L_n$ representing the association between the input record and the category $C_n$:

$$L_n = \frac{W_1}{W_1 + W_2} L_{n1} + \frac{W_2}{W_1 + W_2} L_{n2}.$$

In the preceding expression, the statistical value associated with the category assessor having the higher accuracy will have a greater contribution to the overall composite statistical value $L_n$. Persons of ordinary skill in the art will recognize that other techniques may also be used to combine individual statistical values into a composite statistical value. For example, such techniques include: averaging the statistical values, ranking the statistical values and choosing the median, the mode, the maximum value, the minimum value, etc., and/or any other technique for combining statistical values.

Returning to FIG. 8, after statistical value combining is completed at block 832, or if statistical value combining is not enabled and, thus, the results of each category assessment are maintained separately, control proceeds to block 836. At block 836, the classifier 110 determines candidate categories into which the input record should be classified. For example, at block 836 the category mapper 270 may evaluate the statistical values and/or composite statistical values associated with each category to determine one or more candidate categories to include in the category map 160 associated with the input record. The category mapper 270 may determine the candidate categories by any or all of selecting one or more categories associated with non-zero statistical values, selecting one or more categories associated with statistical values meeting a required threshold, and/or selecting one or more categories based on ranking their associated statistical values, etc., to determine the candidate categories. After the candidate categories are determined at block 836, control proceeds to block 840 at which the classifier 100 determines whether the size of the category map is restricted to a limited number of categories. If the size of the category map is restricted (block 840), control proceeds to block 844 at which, for example, the category mapper 270 prunes the candidate categories to fit within the size restriction. The category mapper 270 may prune the candidate categories by: 1) ranking the statistical values for the candidate category or categories with the category or categories already included in the category map for the input record; 2) marking a candidate category for inclusion in the category map only if there is room in the category map or if the statistical value associated with the particular candidate category exceeds the minimum statistical value already included in the category map; and, 3) if appropriate, marking one or more existing categories having statistical values smaller than those of one or more candidate categories for removal from the category map to make room for the one or more candidate categories based on, for example, storage space constraints, etc.

After the candidate categories are pruned at block 844, control proceeds to block 848 at which, for example, the category mapper determines the category map 160 to associate with the input record. The category map 160 includes the statistical values representing the association/classification of the input record into one or more categories defined by the file plan. After the category map 160 associated with the input record is determined at block 848, execution of the example machine readable instructions 800 ends.

Example machine readable instructions 1100 that may be executed to implement the example retention unit 120 of FIGS. 1 and 4 are shown in FIG. 11. The example machine readable instructions 1100 operate to determine whether a record subject to a records management program should be retained or destroyed. The example machine readable instructions 1100 may be executed upon a request to process a particular record, upon receipt of a query to process a set of records meeting a specified criteria (such as, for example, being stored in a records management system for a specified minimum period of time), each time a new record is classified into one or more categories defined by a file plan used to implement the records management program, at predetermined intervals (such as, for example, part of a larger control loop implementing a records management process), based on an occurrence of a predetermined event (such as, for example, after a predetermined number of records have been stored in a records management system), etc., or any combination thereof.

The machine readable instructions 1100 begin execution at block 1104 at which the retention unit 120 obtains, for example, the category map 160 associated with a record to be processed. For example, the category map selector/parser 410 of FIG. 4 may obtain the category map 160 based on a request to process a particular record, and/or based on a control loop sequencing through the records governed by the records management program, and/or based on whether the category map 160 contains one or more categories being queried for processing, etc. Additionally, the category map selector/parser 410 may parse the category map 160 to obtain the map's contents. Referring back to FIG. 5, the category map 160 includes one or more category map entries, such as the category map entry 310. The category map entry 310 includes a particular category 330 into which the record being processed is classified and a statistical value 340 to represent the association between the record and the category 330. Additionally, the category map entry 310 may include a retention rule as one or more management rules 350 associated with the category 330. The retention rule may specify a retention period governing the length of time a record classified into the category 330 is to be retained under the records management program, as well as other parameters defining the record retention procedure for the category 330.

After the retention unit 120 obtains the category map 160 for the record to be processed (block 1104), control proceeds to block 108 at which the retention unit 120 determines whether the category map 160 contains multiple categories (e.g., such as the categories 330 and 360) indicating that the record is potentially classified into more than one category defined by the file plan. For example, the rule retriever 420 may determine whether multiple categories are present as it directly and/or indirectly retrieves one or more retention rules corresponding to one or more categories included in the category map 160. If the category map contains multiple categories (block 1108), control proceeds to block 1112 at which the retention unit 120 determines whether the retention procedure of the records management program enables combining of common retention rules. Common retention rule combining may be appropriate when, for example, two or more retention rules associated with a respective two or more categories have similar retention periods. Such common retention rules may be combined into a single retention rule possessing a particular retention period by combining their respective individual statistical values (e.g., such as the statistical values 340 and 370) into a single composite statistical value associated with the particular retention rule. If common retention rule combining is enabled (block 112), control proceeds to block 116 at which, for example, the rule combiner 430 combines, if appropriate, the individual statistical values associated with common, but separate, retention rules to determine a composite statistical value representing the association of the input record to the particular retention rule being combined.

An example technique for combining common retention rules is illustrated in FIG. 12. The example of FIG. 12 depicts two category map entries 1210 and 1220 included, for example, in the category map 160 associated with the record being processed. As shown, the first category map entry 1210 corresponds to a first category $C_1$ associated with the record by a statistical value $L_1$. Similarly, the second category map entry 1220 corresponds to a second category $C_2$ associated with the record by a statistical value $L_2$. Additionally, the first category map entry 1210 and the second category map entry 1220 each have a common retention rule R. Because the categories $C_1$ and $C_2$ have a common retention rule R, the association of the record to this rule may be represented by combining the statistical values individually associating the record to each category containing this rule. In the example of FIG. 12, the combined common retention rule 1230 is determined by forming the union $C_{1 \cup 2}$ of the individual categories $C_1$ and $C_2$ resulting in a composite statistical value $L_{1 \cup 2}$ which is the union of the individual statistical values $L_1$ and $L_2$. Assuming that the statistical values represent probabilities, and the probability of the record belonging to category $C_1$ and the probability of the record belonging to category $C_2$ are independent or approximately independent, then the composite statistical value $L_{1 \cup 2}$ may be determined or estimated by the expression:

$$L_{1 \cup 2} = L_1 + L_2 - L_1 L_2.$$

In the preceding expression, the composite statistical value $L_{1 \cup 2}$ is determined as the sum of the probabilities of the record belonging to category $C_1$ or $C_2$ subtracted by the probability of the record belonging to both category $C_1$ and $C_2$. Persons of ordinary skill in the art will recognize that any other appropriate technique may also be used to combine individual statistical values into a composite statistical value for purposes of common retention rule combining.

Returning to FIG. 11, after common retention rules are combined (block 1116), or if common retention rule combining is not enabled (block 1112), or if the category map 160 does not include multiple categories and, thus, common retention rule combining is not required (block 1108), control proceeds to block 1120. At block 1120, the retention unit 120 selects one or more retention rules to govern the retention process. For example, the rule evaluator 440 may select the retention rule or rules having the highest statistical value and/or composite statistical value. Next, control proceeds to block 1124 at which, for example, the rule evaluator 440 determines whether multiple retention rules having the same maximum statistical value were selected at block 1120. If such a tie exists (block 1124), control proceeds to block 1128 at which the rule evaluator 440 may select the retention rule, for example, having the longest retention period. Then, after the retention rule is selected at block 1128, or if no tie between multiple rules existed (block 1124), control proceeds to block 1132 at which, for example, the rule evaluator 440 evaluates the retention period of the selected retention rule. If at block 1136 the rule evaluator 440 determines that the retention period has been exceeded, control proceeds to block 1140 at which the retention unit 110 flags the record for destruction. Otherwise, if the retention period has not been exceeded (block 1136), the retention unit 110 may do nothing, thereby implicitly indicating that the record should be retained. After processing at blocks 1136 and/or 1140 completes, execution of the example machine readable instructions 1100 ends.

Example machine readable instructions 1300 that may be executed to implement the production unit 130 of FIGS. 1 and 6 are shown in FIG. 13. The example machine readable instructions 1300 operate to produce a record subject to a records management program for subsequent inspection and/or use. The example machine readable instructions 1300 may be executed, for example, upon receipt of a query to produce a record or records meeting one or more specified criteria, such as being classified into one or more specified categories of a file plan used to implement the records management program.

The machine readable instructions 1300 begin execution at block 1304 at which the production unit 120 obtains, for example, the category map 160 associated with a record to be processed. For example, the category map selector/parser 610 of FIG. 6 may obtain the category map 160 based on a request to produce a particular record, and/or based on a control loop sequencing through the records governed by the records management program, and/or based on whether the category map 160 contains one or more categories being queried for processing, etc. Additionally, the category map selector/parser 610 may parse the category map 160 to obtain the map's contents. Referring back to FIG. 7, the category map 160 includes one or more category map entries, such as the category map entry 310. The category map entry 310 includes a particular category 330 into which the record being processed is classified and a statistical value 340 to represent the association between the record and the category 330. Additionally, the category map entry 310 may include one or more management rules 350 associated with the category 330.

After the production unit 130 obtains the category map 160 at block 1304 for the record to be processed, control proceeds to block 1308 at which the production unit 130 determines whether the category map 160 includes at least one specified category included in the record production query. If the category map 160 does not include at least one specified category (block 1308), execution of the example machine readable instructions ends because the record being processed is not classified into a category meeting the query criteria. However, if the category map does contain at least one specified category (block 1308), control proceeds to block 1312 at which the production unit 130 determines whether the record production procedure of the records management program has a statistical value requirement. For example, the statistical value for a specified category may be required to meet a threshold representative of a minimum association between a record and a category in order for the record to be considered classified into the category for purposes of record production.

If a statistical value requirement is present (block 1312), control proceeds to block 1316 at which, for example, the statistical value processor 620 compares the statistical value or values in the category map 160 associated with the specified category or categories to the statistical value requirement. For example, the statistical value processor 620 may compare the statistical value or values to the required classification threshold. Then, control proceeds to block 1320 at which the production unit 130 determines whether the statistical value requirement is met. For example, the production evaluator 630 may determine whether at least one statistical value processed at block 1316 meets the statistical value requirement (e.g., such as meeting the required classification threshold). If the statistical value requirement is met (block 1320), control proceeds to block 1324 at which the production evaluator 630 flags the record for production. Finally, after processing at block 1324 completes, or if the statistical value requirement is not met (block 1320), execution of the example machine readable instructions 1300 ends.

Figure 14:
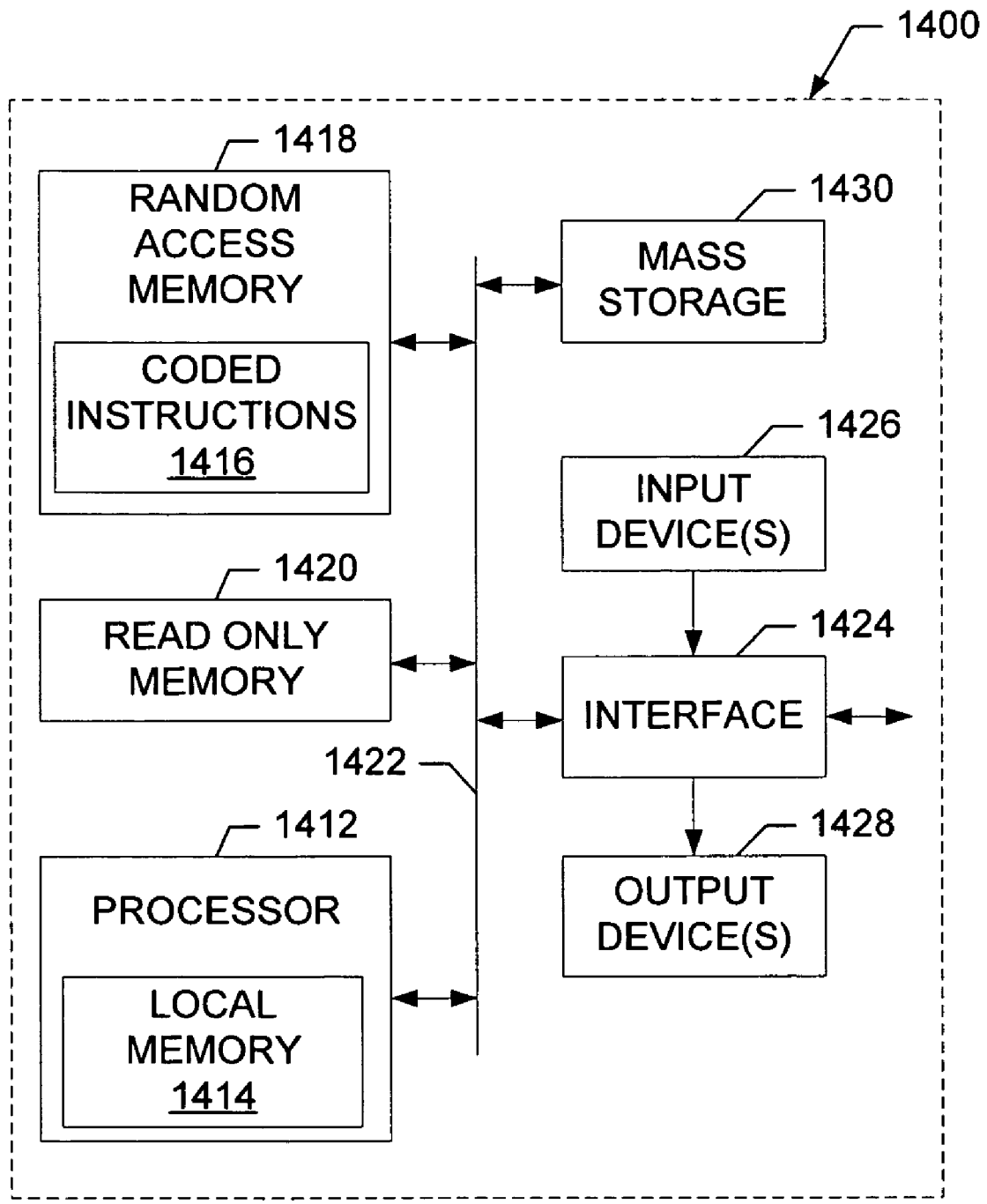
FIG. 14 is a block diagram of an example computer that may execute the example machine readable instructions of FIGS. 8, 11 and/or 13 to implement the example records management system of FIG. 1.

FIG. 14 is a block diagram of an example computer 1400 capable of implementing the apparatus and methods disclosed herein. The computer 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, the machine readable instructions represented in FIGS. 8, 11 and/or 13. The processor 1412 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown) in a conventional manner.

The computer 1400 also includes a conventional interface circuit 1424. The interface circuit 1424 may be implemented by any type of well known interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1400 also includes one or more mass storage devices 1430 for storing software and data. Examples of such mass storage devices 1430 include floppy disk drives, hard drive disks, compact disk drives and digital versatile disk (DVD) drives. The mass storage device 1430 may implement the storage unit 140 of FIG. 1 and/or be used to store records 150 and/or category maps 160. Alternatively, the volatile memory 1418 may implement the storage unit 140 and/or be used to store records 150 and/or category maps 160.

At least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method for records management comprising:

performing a first assessment having a first accuracy and a separate second assessment having a second accuracy to determine respective first and second statistical values, each of the first and second statistical values representing an association between a record and a first category in a plurality of categories;

combining the first statistical value weighted by the first accuracy and the second statistical value weighted by the second accuracy to determine a composite statistical value representing the association between the record and the first category;

classifying the record into the first category when the composite statistical value at least meets a first threshold, wherein the composite statistical value is determined to classify the record;

retrieving a first rule associated with the first category after the record is classified in the first category; and evaluating the composite statistical value against a second threshold associated with the first rule to determine whether to perform an operation with respect to the record according to the first rule associated with the first category.

2. A method as defined in claim 1 wherein the composite statistical value comprises at least one of a confidence level or a probability.

3. A method as defined in claim 1 wherein performing the first assessment comprises determining a likelihood that the record belongs to the first category in the plurality of categories, and wherein the first accuracy is at least one of determined theoretically or determined experimentally based on evaluation of previous classification assessments.

4. A method as defined in claim 3 wherein the likelihood is based on at least one of an automated assessment or a manual assessment.

5. A method as defined in claim 3 wherein the likelihood comprises at least one of a numeric value or a linguistic value.

6. A method as defined in claim 3 wherein determining the first statistical value comprises converting the likelihood from a linguistic value to a numeric value.

7. A method as defined in claim 1 wherein the operation comprises at least one of producing the record, retaining the record, destroying the record, issuing an instruction to produce the record, issuing an instruction to retain the record or issuing an instruction to destroy the record.

8. A method as defined in claim 1 wherein performing the operation with respect to the record according to the first rule associated with the first category comprises performing the operation if the composite statistical value is not less than the second threshold.

9. A method as defined in claim 1 wherein performing the operation with respect to the record according to the first rule associated with the first category comprises performing the operation if the composite statistical value is a maximum value in a set of statistical values associated with a set of categories into which the record is classified.

10. A method as defined in claim 9 wherein the set of statistical values is a first set of statistical values determined by combining at least two statistical values in a second set of statistical values associated with the set of categories, wherein the two statistical values in the second set of statistical values correspond respectively to two categories associated with at least one substantially similar rule.

11. A method as defined in claim 9 wherein performing the operation with respect to the record according to the first rule associated with the first category further comprises performing the operation based on a property of the first rule if the composite statistical value is one of multiple statistical values substantially equal to the maximum value.

12. A method as defined in claim 11 wherein the property is associated with a period of time.

13. A method as defined in claim 1 further comprising electronically storing at least one of the record or a reference to a location of the record.

14. A method as defined in claim 13 further comprising storing the composite statistical value such that the composite statistical value is associated with the first category and at least one of the record or the reference to the location of the record.

15. A method as defined in claim 1 wherein the record comprises at least one of a medical record, an accounting record, a legal record, an insurance record, an employment record, a payroll record or a shipping record.

16. A method as defined in claim 1 wherein the first rule comprises at least one of a retention rule, a confidentiality rule or a security rule.

17. An article of manufacture storing machine readable instructions which, when executed, cause a machine to:
   perform a first assessment having a first accuracy and a separate second assessment having a second accuracy to determine respective first and second statistical values, each of the first and second statistical values representing an association between a record and a first category in a plurality of categories;
   combine the first statistical value weighted by the first accuracy and the second statistical value weighted by the second accuracy to determine a composite statistical value representing the association between the record and the first category;
   classify the record into the first category when the composite statistical value at least meets a first threshold, wherein the composite statistical value is determined to classify the record;
   retrieve a first rule associated with the first category after the record is classified in the first category; and
   evaluate the composite statistical value against a second threshold associated with the first rule to determine whether to perform an operation with respect to the record according to the first rule associated with the first category.

18. An article of manufacture as defined in claim 17 wherein the composite statistical value comprises at least one of a confidence level or a probability.

19. An article of manufacture as defined in claim 17 wherein the machine readable instructions, when executed, cause the machine to perform the first assessment by determining a likelihood that the record belongs to the first category in the plurality of categories, and wherein the first accuracy is at least one of determined theoretically or determined experimentally based on evaluation of previous classification assessments.

20. An article of manufacture as defined in claim 17 wherein the operation comprises at least one of producing the record, retaining the record, destroying the record, issuing an instruction to produce the record, issuing an instruction to retain the record or issuing an instruction to destroy the record.

21. An article of manufacture as defined in claim 17 wherein the machine readable instructions, when executed, further cause the machine to electronically store at least one of the record or a reference to a location of the record, and to store the composite statistical value such that the composite statistical value is associated with the at least one of the record or the reference to the location of the record.

22. A system comprising computer executed operation for records management comprising
   a classifier configured to classify a record into a first category in a plurality of categories based on a first statistical value relating the record to the first category and to classify the record into a second category in the plurality of categories based on a second statistical value relating the record to the second category, wherein the classifier is further configured to determine the first statistical value and the second statistical value to classify the record; and
   a record processing unit configured (i) to combine the first statistical value and the second statistical value after the record has been classified to form a composite statistical value when the first category and the second category have a common rule and (ii) to evaluate the composite statistical value to determine whether to perform an operation with respect to the record according to the common rule when either the first category or the second category has been designated for processing.

23. A system as defined in claim 22 wherein the composite statistical value comprises at least one of a confidence level or a probability.

24. A system as defined in claim 22 wherein the classifier is configured to determine a first likelihood that the record belongs to the first category and a second likelihood that the record belongs to the second category.

25. A system as defined in claim 22 wherein the record processing unit comprises at least one of a retention unit configured to determine whether to retain or destroy the record, or a production unit configured to at least one of produce the record or issue an instruction to produce the record.

26. A system as defined in claim 22 wherein the record processing unit is configured to perform the operation if the composite statistical value is not less than a threshold.

27. A system as defined in claim 22 wherein the record processing unit is configured to perform the operation based on a comparison of the composite statistical value to another statistical value associated with another one of the plurality of categories.

28. A system as defined in claim 22 further comprising a storage unit to store at least one of the record or a reference to a location of the record, and to store the first statistical value and the second statistical value such that the first statistical value is associated with the first category and at least one of the record or the reference to the location of the record and the second statistical value is associated with the second category and at least one of the record or the reference to the location of the record.

29. An apparatus comprising computer executed operation to process a record comprising:
   a category map selector to process a category map associated with the record, wherein the category map comprises a category field associated with a category from a plurality of categories, a statistical value field associated with a statistical value representing a likelihood that the record belongs to the category, and a management rule field associated with at least one rule associated with an operation to be performed with respect to records belonging to the category;

a statistical value combiner to determine the statistical value associated with the statistical value field to classify the record into the category by combining a plurality of statistical values weighted by a respective plurality of assessment accuracies, the plurality of statistical values determined from a respective plurality of separate assessments performed to determine whether the record should be classified into the category;

a rule retriever to retrieve a management rule associated with the management rule field; and a rule evaluator to evaluate the statistical value associated with the statistical value field to determine whether the likelihood of the record belonging to the category is sufficient to process the management rule.

30. An apparatus as defined in claim 29 wherein the-statistical value comprises at least one of a confidence level or a probability.

31. An apparatus as defined in claim 29 wherein the management rule comprises a retention period corresponding to a period of time to retain records in the category.

32. An apparatus as defined in claim 29 wherein the management rule field is structured to store the management rule or the management rule field is structured to store a reference to the management rule.

33. An apparatus as defined in claim 32 wherein the rule retriever is configured to retrieve the management rule from a repository of management rules based on the stored reference.

34. An apparatus as defined in claim 29 wherein the rule evaluator is configured to determine whether the management rule applies to the record based on the statistical value.

35. An apparatus as defined in claim 34 wherein the rule evaluator is configured to determine that the management rule applies to the record by comparing the statistical value to a predetermined criterion.

36. An apparatus as defined in claim 31 wherein the rule evaluator is configured to determine to destroy the record if the statistical value is not less than a predetermined threshold and the retention period has been exceeded.

37. An apparatus as defined in claim 29 further comprising a rule combiner to combine two or more management rules associated with two or more categories based on statistical values associated with the two or more management rules.

38. An apparatus as defined in claim 37 wherein the rule combiner is configured to combine the two or more management rules if the two or more management rules comprise substantially similar parameters.

39. An apparatus as defined in claim 38 wherein the substantially similar parameters comprise retention periods.

40. An apparatus comprising computer executed operation to produce a record comprising:

a category map selector to process a category map associated with the record, wherein the category map comprises a first category field and a second category field associated respectively with a first category and a second category from a plurality of categories, and a first statistical value field and a second statistical value field associated respectively with a first statistical value representing a first likelihood that the record belongs to the first category and a second statistical value representing a second likelihood that the record belongs to the second category, wherein the first and the second statistical values are determined to classify the record into the first and second categories;

a statistical value processor to process the first statistical value associated with the first statistical value field and the second statistical value associated with the second statistical value field to determine whether the likelihood of the record belonging to either the first category or the second category is sufficient to produce the record in response to a query to produce records associated with the first and second categories; and a production evaluator to at least one of produce the record or issue an instruction to produce the record in response to the determination by the statistical value processor.

41. An apparatus as defined in claim 40 wherein the first statistical value comprises at least one of a confidence level or a probability.

42. An apparatus as defined in claim 40 wherein the statistical value processor is configured to compare the first statistical value and the second statistical value to a criterion.

43. An apparatus as defined in claim 42 wherein the criterion represents a required degree of association between the record and a particular category to produce the record in response to a query to produce records belonging to the particular category.

44. An apparatus as defined in claim 40 wherein the production evaluator is configured to at least one of produce the record or issue the instruction to produce the record if either the first statistical value or the second statistical value is not less than a threshold.

* * * * *